(12) United States Patent
Huang et al.

(10) Patent No.: US 11,258,085 B2
(45) Date of Patent: Feb. 22, 2022

(54) ELECTRICITY GENERATION DEVICES USING FORMIC ACID

(71) Applicant: King Abdullah University of Science and Technology, Thuwal (SA)

(72) Inventors: Kuo-Wei Huang, Thuwal (SA); Junrong Zheng, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 233 days.

(21) Appl. No.: 15/776,915

(22) PCT Filed: Dec. 14, 2016

(86) PCT No.: PCT/IB2016/057628
§ 371 (c)(1),
(2) Date: May 17, 2018

(87) PCT Pub. No.: WO2017/103820
PCT Pub. Date: Jun. 22, 2017

(65) Prior Publication Data
US 2018/0337416 A1 Nov. 22, 2018

Related U.S. Application Data

(60) Provisional application No. 62/267,645, filed on Dec. 15, 2015.

(51) Int. Cl.
*H01M 8/0612* (2016.01)
*H01M 16/00* (2006.01)
(Continued)

(52) U.S. Cl.
CPC .......... *H01M 8/0631* (2013.01); *B01J 6/008* (2013.01); *B01J 8/20* (2013.01); *B60L 50/72* (2019.02);
(Continued)

(58) Field of Classification Search
CPC combination set(s) only.
See application file for complete search history.

(56) References Cited

U.S. PATENT DOCUMENTS 3,321,333 A * 5/1967 Palmer ............... H01M 8/0606
429/513
4,376,097 A * 3/1983 Emelock ............... B60K 8/00
422/616

(Continued)

FOREIGN PATENT DOCUMENTS

| EP | 0817298 | 1/1998 |
| GB | 2250130 | 5/1992 |
| WO | 2015083007 A1 | 6/2015 |

OTHER PUBLICATIONS

Bielinski (Lewis Acid Assisted Formic Acid Dehydrogenation using a Pincer-supported Iron Catalyst Jul. 7, 2014) (Year: 2014).*
(Continued)

*Primary Examiner* — Ula C Ruddock
*Assistant Examiner* — Sarika Gupta
(74) *Attorney, Agent, or Firm* — Billion & Armitage

(57) ABSTRACT

The present disclosure relates generally to new forms of portable energy generation devices and methods. The devices are designed to covert formic acid into released hydrogen, alleviating the need for a hydrogen tank as a hydrogen source for fuel cell power.

17 Claims, 4 Drawing Sheets

(51) Int. Cl.
  *H01M 8/04007* (2016.01)
  *H01M 8/04223* (2016.01)
  *H01M 8/04701* (2016.01)
  *H01M 8/04302* (2016.01)
  *H01M 8/04082* (2016.01)
  *B60L 50/72* (2019.01)
  *B60L 58/40* (2019.01)
  *B60L 58/34* (2019.01)
  *B01J 8/20* (2006.01)
  *H02J 7/00* (2006.01)
  *B01J 6/00* (2006.01)
  *C01B 3/22* (2006.01)
  *C01B 3/00* (2006.01)
  *H02J 7/34* (2006.01)

(52) U.S. Cl.
  CPC .......... *B60L 58/34* (2019.02); *B60L 58/40* (2019.02); *C01B 3/22* (2013.01); *H01M 8/04067* (2013.01); *H01M 8/04216* (2013.01); *H01M 8/04268* (2013.01); *H01M 8/04302* (2016.02); *H01M 8/04738* (2013.01); *H01M 8/0618* (2013.01); *H01M 16/003* (2013.01); *H01M 16/006* (2013.01); *H02J 7/00* (2013.01); *B01J 2208/00203* (2013.01); *B01J 2208/00495* (2013.01); *C01B 3/0015* (2013.01); *C01B 2203/0277* (2013.01); *C01B 2203/066* (2013.01); *C01B 2203/085* (2013.01); *C01B 2203/0838* (2013.01); *C01B 2203/107* (2013.01); *C01B 2203/1047* (2013.01); *C01B 2203/1064* (2013.01); *C01B 2203/1211* (2013.01); *H01M 2250/20* (2013.01); *H01M 2250/402* (2013.01); *H02J 7/345* (2013.01); *Y02B 90/10* (2013.01); *Y02T 10/70* (2013.01); *Y02T 90/40* (2013.01)

(56) References Cited

U.S. PATENT DOCUMENTS

| | | | |
|---|---|---|---|
| 6,506,510 B1* | 1/2003 | Sioui | H01M 8/04014 |
| | | | 429/411 |
| 9,963,411 B2 | 5/2018 | Huang et al. | |
| 2010/0080735 A1 | 4/2010 | Zimmermann | |
| 2010/0323260 A1* | 12/2010 | Imamura | H01M 8/04253 |
| | | | 429/430 |
| 2013/0004800 A1* | 1/2013 | Nakahara | B01J 19/1887 |
| | | | 429/9 |

OTHER PUBLICATIONS

Extended European Search Report for Application No. 19187792.7, 9 pages, dated Oct. 30, 2019.
International Search Report and Written Opinion, dated May 8, 2017, from corresponding PCT Application No. PCT/IB2016/057628.

* cited by examiner

Figure 3. Formic acid hydrogen fuel cell electricity generation and power management designs for automobiles and other applications with removing $CO_2$.

Figure 4. Formic acid hydrogen fuel cell electricity generation and power management designs for automobiles and other applications with device to remove $CO_2$.

ELECTRICITY GENERATION DEVICES USING FORMIC ACID

CROSS-REFERENCE TO RELATED APPLICATIONS

This application is the National Stage of International Application No. PCT/IB2016/057628, filed Dec. 14, 2016, which claims the benefit of and priority to U.S. Provisional Application No. 62/267,645 filed Dec. 15, 2015, which is hereby incorporated by reference in its entirety.

BACKGROUND

Electrical automobiles are gradually replacing traditional gasoline-based counterparts, because of their clean and renewable nature. However, two current approaches (Li-battery technology and hydrogen fuel cells technology) suffer significant limitations. For example, the recharging time (multiple hours) for Li-batteries can be too long for some users, and the power capacity is not large enough for a long driving range. Additionally, the storage and transportation of hydrogen gas for use of hydrogen fuel cell technology raises serious safety concerns. The pressure of a hydrogen tank in hydrogen fuel cell car can be up to 600 times larger than the atmosphere pressure, and hydrogen gas is extremely flammable.

SUMMARY

The present disclosure relates generally to new forms of portable energy generation devices and methods. The devices are designed to covert formic acid into released hydrogen, alleviating the need for a hydrogen tank as a hydrogen source for fuel cell power. This technology is clean and renewable and overcomes the limitations of Li-batteries and hydrogen tanks.

In a first aspect, the present disclosure describes an electricity generation device for powering a fuel cell using formic acid, comprising: (a) a formic acid reservoir; (b) a reaction chamber: (c) a conduit for delivering formic acid from the formic acid reservoir to the reaction chamber; (d) a fuel cell that generates at least electricity and heat as by-products; wherein the reaction chamber is capable of receiving heat generated by operation of the fuel cell or from another heat source and promoting the formic acid to convert to hydrogen and carbon dioxide, wherein the initial heating is powered by a battery; (e) a delivery system for moving converted hydrogen into the fuel cell; and (f) a battery powered by electricity generated by the fuel cell.

In one or more embodiments of the first aspect, the device further comprises a power converter for converting electricity generated via operation of the fuel cell to an appropriate current for delivery to the battery; and/or the reaction chamber comprises a heating reaction chamber; and/or the reaction chamber further comprises a heat insulator; and/or the reaction chamber further comprises an exhaust gas react furnace; and/or the reaction chamber further comprises a stir system; and/or the device further comprises a heat pipe for delivering heat from the fuel cell to the reaction chamber, to the formic acid reservoir, or both; and/or the delivery system for moving converted hydrogen into the fuel cell further comprises a flow meter; and/or further comprises a tank and filter system for storing the hydrogen and carbon dioxide leaving the reaction chamber; and/or the battery powers one or more drive motors; and/or the battery powers one or more drive motors of an automobile; and/or the battery powers one or more ultra-capacitors, optionally the one or more ultracapacitors power one or more drive motors of an automobile; and/or further comprises a heating control, optionally the heating control is powered by the battery; and/or further comprises a feed pump for moving the formic acid into and through the conduit for delivering the formic acid to the reaction chamber, optionally the feed pump is powered by the battery; and/or the reaction chamber expels carbon dioxide and delivers hydrogen to the delivery system; and/or the reaction chamber comprises formic acid, catalyst, and/or solvent and base, and generates hydrogen and carbon dioxide; and/or further comprises use of one or more catalysts or a combination of catalysts for the reaction, and wherein heat is delivered in order to increase the reaction rate.

In a second aspect, the present disclosure describes an electricity generation device for powering a fuel cell using formic acid, comprising: (a) a formic acid reservoir; (b) a reaction chamber; (c) a fuel cell that generates electricity, wherein the reaction chamber is capable of using a catalyst and heat to convert the formic acid to hydrogen and carbon dioxide; (d) a delivery system for moving converted hydrogen into the fuel cell; and (f) a battery powered by electricity generated by the fuel cell.

In a third aspect, the present disclosure describes a method for generating electricity for powering a fuel cell using formic acid, comprising: (a) providing a source of formic acid, a reaction chamber, and a fuel cell that generates electricity; (b) delivering formic acid to the reaction chamber, wherein the reaction chamber causes the formic acid to convert to hydrogen and carbon dioxide; (c) delivering the converted hydrogen to the fuel cell; and (d) powering a battery by electricity generated by the fuel cell.

DETAILED DESCRIPTION

The present methods and devices address alternate electricity options based on production of hydrogen from formic acid. Formic acid is a naturally-occurring product and is relatively safe in low concentrations. The $HCO_2H$ molecule is also a precursor for some fuel production processes. Rich in hydrogen and carbon, it is a liquid in atmospheric temperatures. The formic acid molecule also decomposes with heat into simple carbon dioxide and water. Various methods of converting formic acid to hydrogen are contemplated for use in the methods and devices described herein. By way of example, PCT Application No. PCT/US14/67546, claiming benefit to U.S. Provisional 61/910,530 filed Dec. 2, 2013, described a method for the conversion of formic acid (FA) into hydrogen.

Figure 1:
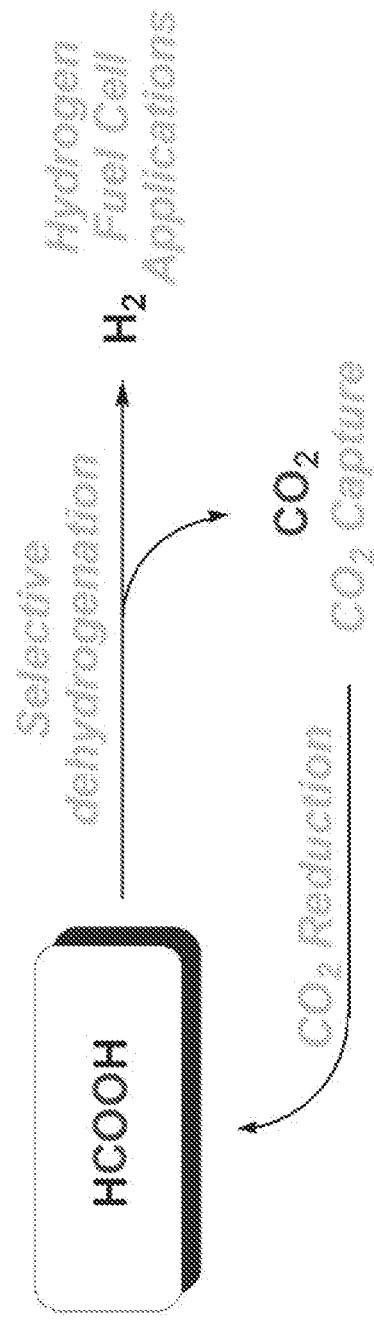
FIG. 1 shows a schematic view of one embodiment for converting formic acid to hydrogen.

The decomposition of formic acid to $H_2$ and $CO_2$ is thermodynamically favored, but the energy barrier is high and the selectivity is low (for the formation of $H_2O$ and CO). Thus, suitable catalysts are selected for more efficient hydrogen generation from formic acid, rather than for the formation of $H_2O$ and CO. See process outlined in FIG. 1.

This figure illustrates a hydrogen generation system based on the concept of employing carbon dioxide as a hydrogen carrier. Utilizing $CO_2$ as a medium for hydrogen storage relies on the use of efficient catalysts for both hydrogenation of $CO_2$ and selective dehydrogenation of formic acid. Novel catalysts based on pincer ligands are used with good selectivity and high turnover numbers. This technology allows the use of formic acid in connection with fuel cells without the associated problems presented by hydrogen tanks (including their pressure, storage, and weight).

Fuel cell systems provide a promising, cleaner, and quieter way to create energy and electricity. A fuel cell system produces electrical energy as a main product by combining a fuel source of liquid, gaseous, or solid hydrogen with a source of oxygen, such as oxygen in the air or compressed oxygen. A fuel cell system has several outputs in addition to electrical power. For example, thermal power (heat), water, and oxygen-depleted air are produced as by-products. These by-products are less harmful than other toxic emissions from some of the current power generation and/or gasoline burning processes.

Formic acid is a relatively non-toxic chemical, which can be used as a food additive as approved by FDA. It is one of the major products formed in biomass processing and can be a convenient hydrogen carrier for fuel cells designed for portable electricity generation and use. The decomposition of formic acid into hydrogen is a promising way to solve the difficulty of hydrogen gas storage, which has severely limited the "hydrogen economy." A sustainable cycle can be envisioned using formic acid to supply hydrogen.

To store hydrogen, hydrogen and $CO_2$ are added together to form formic acid. To release hydrogen, formic acid is decomposed into hydrogen and $CO_2$. The hydrogen storage density of formic acid is relatively high. In one example, it can be about 53 g $H_2$/L. This amount can be suitable for automobile and portable applications. An efficient catalytic system for hydrogen generation from formic acid (as outlined in U.S. Serial No. PCT/US14/67546, claiming benefit to U.S. Provisional 61/910,530 filed Dec. 2, 2013) is useful in the applications. The reaction rate (turnover frequency >10,000/hr) and lifetime (turnover number over 1,000,000) of formic acid that can be achieved now renders the technology useful for automobile and other mobile applications.

Because formic acid is low cost, nonflammable, readily available as exhaust from fuel cells, and contains only water and $CO_2$, an automobile or other electricity-requiring device or system constructed based on the formic acid technology can be environmentally-friendly. The system is unlikely to explode or ignite. Because of its nonflammable nature, formic acid in an automobile, for example, can easily reach a driving range of 3000 miles, which is 8-10 times better than current automobiles. Such a long driving range can be very important for many applications (e such as for military applications or other long-range uses). In addition, the technology can be used independently or integrated with electrical automobiles in order to provide an instant power source so that the long battery charging time can be avoided.

Figure 2:
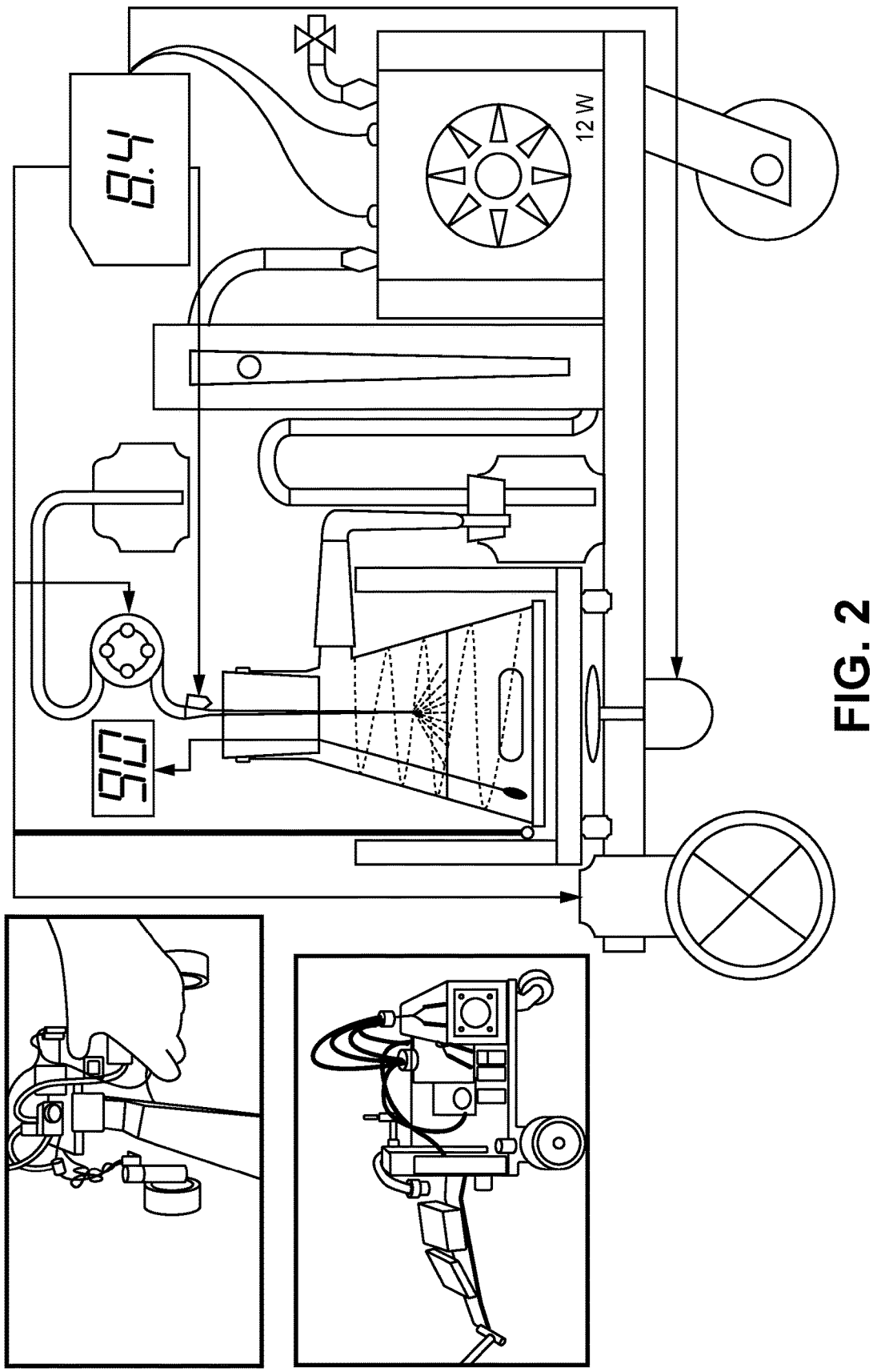
FIG. 2 shows a prototype of an electric car that uses conversion of formic acid to hydrogen to power a fuel cell.

By way of example, a 12 W hydrogen fuel cell model car based on this technology was built and is the first self-sustainable formic acid model car. One example is illustrated by FIG. 2. Similar systems for automobiles with higher power (400 W, 2 KW, and 35 KW) are provided herein as well.

Provided herein is a formic acid hydrogen fuel cell electricity generation system. The system provides the core technology that used to construct automobiles or other motor/electricity-requiring vehicles or other equipment based on the formic acid technology.

Figure 3:
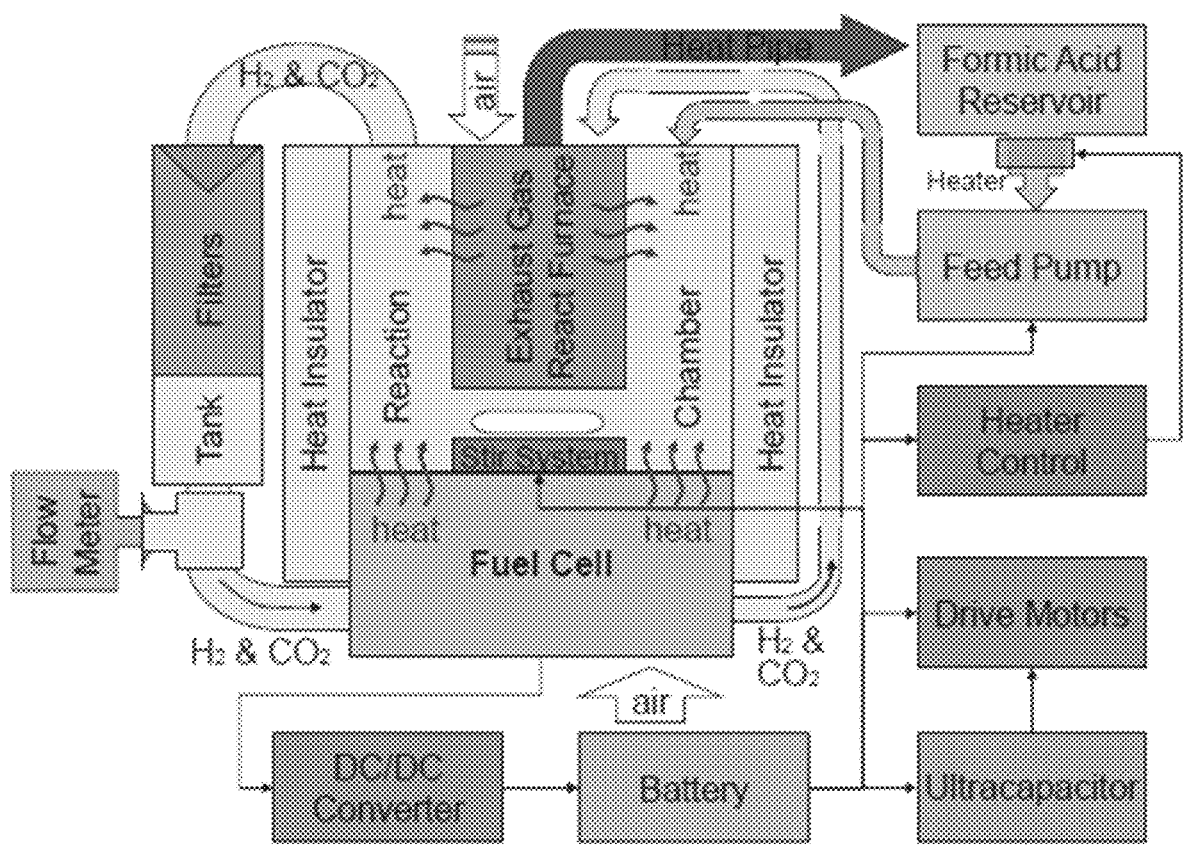
FIG. 3 shows a schematic of a fuel cell system that is powered using hydrogen derived from formic acid.
Figure 4:
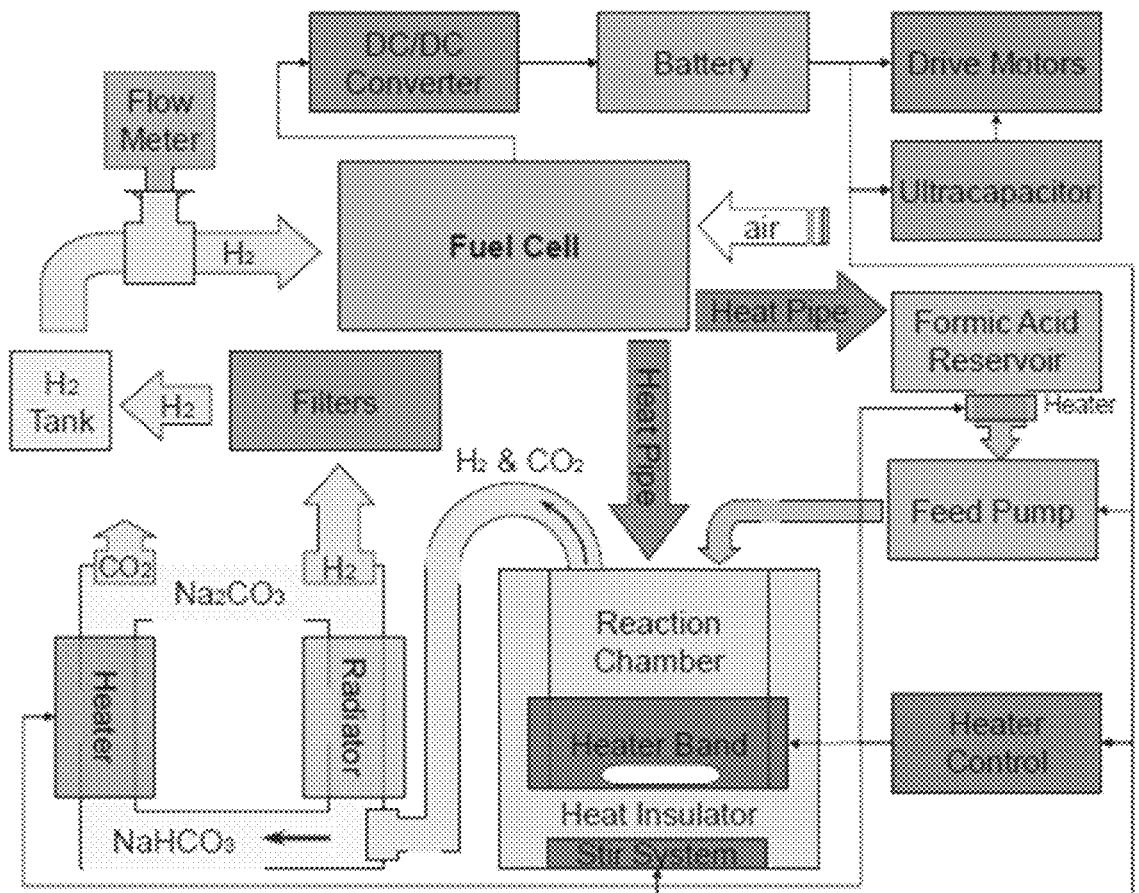
FIG. 4 shows a blown apart view of the schematic of FIG. 3.

Examples of a system that uses formic acid for powering a fuel cell are illustrated by FIGS. 3 and 4. By way of example, the fuel cell is used to power a battery. Optionally, the battery is used to power one or more drive motors of an automobile. Although this disclosure is generally directed toward the use of this technology in connection with automobiles, it should be understood that the technology may be used in connection with any electricity-requiring device, including but not limited to hydrogen generators (without fuel cells); electricity generators; other mobile applications, such as cell phone/laptop power source/charger, drones, transportation uses, such as electric cars/airplanes/other vehicles and other equipment. These examples are intended only to be illustrative only and are non-limiting examples of potential uses of the technology described herein.

As illustrated, a formic acid reservoir is optionally provided for containing an appropriate amount of formic acid. It is generally expected that the formic acid will be in liquid form, but other options are possible and considered within the scope of this disclosure. The formic acid reservoir may be fluidly connected to a reaction chamber. For example, a conduit or inlet valve may be provided for delivering formic acid from the formic acid reservoir to the reaction chamber. In one example, the formic acid reservoir may be fluidly connected to the reaction chamber via a feed pump. The feed pump can move the formic acid into the reaction chamber.

In addition to being fed with formic acid, the reaction chamber may also be fed with heat. The heat may be delivered to the reaction chamber via a heat pipe from the fuel cell. Additionally or alternatively, heat from operation of the fuel cell is delivered to the formic acid reservoir. During operation, a fuel cell generates heat as one of its byproducts. The systems may use that generated heat in order to provide heat required by the reaction chamber. The reaction chamber converts the formic acid it receives into hydrogen ($H_2$) and carbon dioxide ($CO_2$). One example of a method for this conversion is described in application U.S. Provisional No. 62/262,247, filed on Dec. 2, 2015, entitled "Utilization and Recycling of Emitted Carbon Dioxide," the entire contents of which are incorporated hereby reference. It is possible for one or more catalysts to be used during the conversion process. The one or more catalysts may include but are not limited to homogeneous or heterogeneous Fe, Ru, Ir, Pd, Ag catalysts, other catalysts, or combinations thereof. It should be understood, however, that other methods for conversion of formic acid into hydrogen are possible and considered within the scope of this disclosure.

As shown, the reaction chamber may include a stir system for mixing the reactants. The reaction chamber is optionally associated with or surrounded by a heat insulator to prevent or reduce heat from undesirably escaping. The reaction chamber may also include an exhaust gas react furnace to transfer the heat to the reactor. The carbon dioxide may be moved into a tank (with or without filter) for other uses or for recycling into the reactor. The reaction chamber is optionally used in connection with a heater control. The heater control controls the heat to be delivered to the reaction chamber via an electric heater or the fuel cell.

The electricity generation system optionally includes a delivery system for moving the hydrogen that is recovered from the formic acid into the fuel cell. In one example, the delivery system includes one or more filters. For example, the delivery system includes one or more hydrogen tanks. Optionally, the delivery system includes a flowmeter. The one or more filters act to filter the hydrogen gas as it leaves the reaction chamber. The one or more tanks are used to store the hydrogen, carbon dioxide, or both separately that leave the reaction chamber. It is possible for the flowmeter to be used to control the flow of hydrogen that is delivered to the fuel cell. Delivery of the hydrogen to the fuel cell provides the input that the fuel cell needs in order to generate electricity. As shown by FIG. 4, the fuel cell also receives an oxygen input.

The fuel cell optionally cooperates with a power converter to convert electricity generated by operations of the fuel cell to an appropriate current for delivery to a battery. In one example, the power converter is optionally a DC/DC converter. The converted power is optionally delivered to a battery. The battery may be any appropriate battery necessary for powering the electric device to be powered. In one example, the battery is an electric car battery for powering an electric automobile.

Power from the battery is optionally delivered to one or more drive motors. By way of example, the one or more drive motors may be drive motors of an automobile. Power from the battery is optionally delivered to one or more ultra-capacitors. The one or more ultra-capacitors, for example, power one or more of the drive motors. Power from the battery is optionally delivered to the heater control and/or the feed pump. The feed pump then powers the pump's movement of formic acid through the system.

In use, there may be provided a method for generating electricity for powering a fuel cell using formic acid. The method may include (a) providing a source of formic acid, a reaction chamber, and a fuel cell that generates electricity; (b) delivering formic acid to the reaction chamber, wherein the reaction chamber causes the formic acid to convert to hydrogen and carbon dioxide; (c) delivering the converted hydrogen to the fuel cell; and (d) powering a battery by electricity generated by the fuel cell.

Changes and modifications, additions and deletions may be made to the structures and methods recited above and shown in the drawings without departing from the scope or spirit of the disclosure or the following claims.

Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compositions may not be explicitly disclosed, each is specifically contemplated and described herein. For example, if a method is disclosed and discussed and a number of modifications that can be made to a number of compositions including the method are discussed, each and every combination and permutation of the method, and the modifications that are possible are specifically contemplated unless specifically indicated to the contrary.

Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An electricity generation system comprising:
(a) a formic acid reservoir containing a liquid consisting of formic acid;
(b) a reaction chamber in fluidic connection with the formic acid reservoir;
(c) a conduit for delivering the liquid from the formic acid reservoir to the reaction chamber;
(d) a fuel cell configured to power an electric vehicle by generating at least electricity and heat as by-products;
(e) a delivery system for moving hydrogen from the reaction chamber into the fuel cell;
(f) a battery powered by electricity generated by the fuel cell; and
(g) a heater control powered by the battery and an electric heater configured to deliver heat to the reaction chamber;
wherein the reaction chamber is configured to receive the heat from the fuel cell and generate hydrogen from the liquid using only the heat received from the fuel cell, with the proviso that-the initial heating of the reaction chamber via the electric heater is controlled by the heater control powered by the battery.

2. The system of claim 1, further comprising a power converter for converting electricity generated via operation of the fuel cell to an appropriate current for delivery to the battery.

3. The system of claim 1, wherein the reaction chamber further comprises a heat insulator.

4. The system of claim 1, wherein the reaction chamber further comprises a stir system.

5. The system of claim 1, further comprising a heat pipe for delivering heat from the fuel cell to at least one of the reaction chamber and the formic acid reservoir.

6. The system of claim 1, further comprising a tank and filter system for storing the hydrogen and carbon dioxide leaving the reaction chamber.

7. The system of claim 1, wherein the battery powers one or more drive motors.

8. The system of claim 1, wherein the battery powers one or more drive motors of an automobile.

9. The system of claim 1, wherein the battery powers one or more ultra-capacitors.

10. The system of claim 9, wherein the one or more ultra-capacitors power one or more drive motors of an automobile.

11. The system of claim 1, wherein the heating control further controls heat delivered to the reaction chamber or the formic acid reservoir from the fuel cell.

12. The system of claim 1, further comprising a feed pump for moving the liquid into and through the conduit for delivering the liquid to the reaction chamber.

13. The system of claim 1, wherein the reaction chamber expels carbon dioxide and delivers hydrogen to the delivery system.

14. The system of claim 1, wherein the delivery system for moving converted hydrogen into the fuel cell further comprises a flow meter.

15. The system of claim 12, wherein the feed pump is powered by the battery.

16. The system of claim 1, wherein the reaction chamber includes a pincer catalyst for both hydrogenation of carbon dioxide and selective dehydrogenation of the liquid.

17. The system of claim 1, wherein the fuel cell is a 12 W, 400 W, 2 KW, or 35 KW fuel cell.

* * * * *